United States Patent [19]

Lembke

[11] Patent Number: 4,821,584
[45] Date of Patent: Apr. 18, 1989

[54] PIEZOELECTRIC FILM LOAD CELL ROBOT COLLISION DETECTOR

[75] Inventor: John R. Lembke, Overland Park, Kans.

[73] Assignee: The United States of America as represented by the United States Department of Energy, Washington, D.C.

[21] Appl. No.: 168,367

[22] Filed: Mar. 15, 1988

[51] Int. Cl.[4] ............................................. G01L 1/16
[52] U.S. Cl. ................................. 73/862.68; 310/338; 310/800
[58] Field of Search ..................... 73/862.68, DIG. 4; 310/338, 800; 340/365 A

[56] References Cited

U.S. PATENT DOCUMENTS

| | | | |
|---|---|---|---|
| 3,935,485 | 1/1976 | Yoshida et al. | 340/365 A X |
| 3,940,637 | 2/1976 | Ohigashi et al. | 340/365 A X |
| 3,952,880 | 4/1976 | Hill et al. | 214/1 |
| 4,158,117 | 6/1979 | Quilliam et al. | 310/338 X |
| 4,286,459 | 9/1981 | Trimmer et al. | 73/862.59 |
| 4,348,142 | 9/1982 | Figour | 414/2 |
| 4,488,873 | 12/1984 | Bloomfield et al. | 433/71 |
| 4,499,394 | 2/1985 | Koal | 310/330 |
| 4,512,431 | 4/1985 | Bloomfield | 310/800 X |
| 4,555,953 | 12/1985 | Dario et al. | 73/862.04 |
| 4,634,917 | 1/1987 | Dvorsky et al. | 310/328 |
| 4,648,784 | 3/1987 | Wiedemann et al. | 414/730 |

Primary Examiner—Charles A. Ruehl
Attorney, Agent, or Firm—George H. Libman; James H. Chafin; Judson R. Hightower

[57] ABSTRACT

A piezoelectric load cell which can be utilized for detecting collisions and obstruction of a robot arm end effector includes a force sensing element of metallized polyvinylidene fluoride (PVDF) film. The piezoelectric film sensing element and a resilient support pad are clamped in compression between upper and lower plates. The lower plate has a central recess in its upper face for supporting the support pad and sensing element, while the upper plate has a corresponding central projection formed on its lower face for bearing on the sensing element and support pad. The upper and lower plates are dowelled together for concentric alignment and screwed together. The upper and lower plates are also adapted for mounting between the robot arm wrist and end effector.

10 Claims, 1 Drawing Sheet

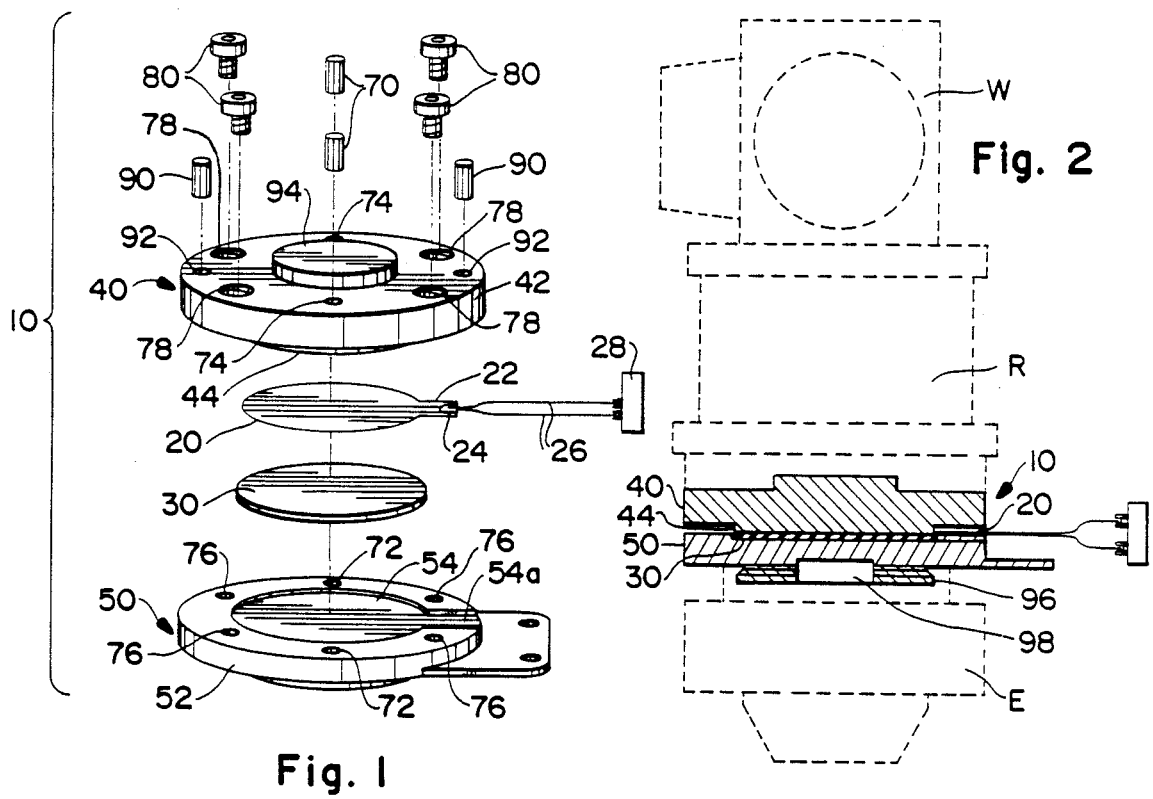
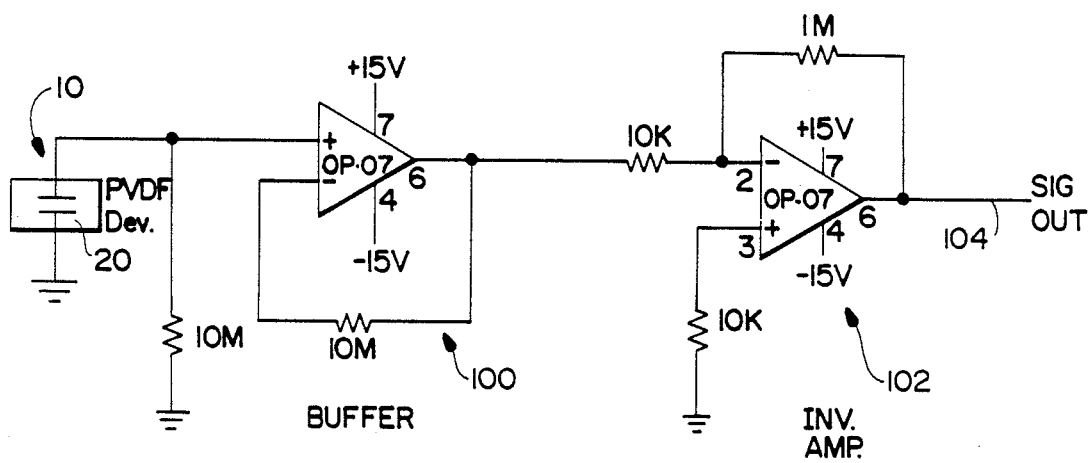
Fig. 1
Fig. 2
Fig. 3

PIEZOELECTRIC FILM LOAD CELL ROBOT COLLISION DETECTOR

The U.S. Government has rights in this invention under the terms of contract No. DE-AC-04-76DP00613 awarded by the U.S. Department of Energy to Allied Corporation.

BACKGROUND AND SUMMARY OF THE INVENTION

The present invention pertains to the detection of collisions and conditions of excessive force encountered between objects such as industrial robot arms and workpieces. In particular, the present invention relates to a piezoelectric load cell which finds advantageous utility when applied to a robot arm as a collision detector.

In the industrial use of robots for assembly and other applications, errors which may occur in location, part size or part shape can lead to collisions or force fit conditions which undesirably generate large and often excessive forces which can damage either the robot, part, workpiece, or all of them.

It is therefore necessary and desirable to detect such collision and force fit situations as may occur during the operation of assembly and other types of industrial robots, in order to prevent the occurrence of damage.

Various devices can be used to detect robot arm end effector collisions. For example, it is possible to provide tactile sensors of various types on the robot arm end effector. However, if a collision occurs between a part carried by the robot and another part or tool, as might occur during an assembly operation, the tactile sensor may not necessarily be involved and thus not be able to detect the collision the force of which therefore may go undetected.

It is known to install so-called "instrumented remote center compliances" (IRCC's) between the robot wrist and end effector for detecting compressive forces resulting from collisions, as well as lateral deflections from other causes such as misalignment. However, available IRCC's are relatively expensive, and provide much more information than is required merely for collision detection. As a result, a relatively large amount of time is required to transmit the data to the robot control, and to analyze the data to determine whether a potentially disastrous collision has occurred, or some other condition. Further, IRCC's are relatively large and heavy, which is disadvantageous to their use as collision detectors, in that the complexity, mass and bulk of the robot arm are undesirably increased thereby.

Known force measurement devices utilized in robotic machinery include the device disclosed in U.S. Pat. No. 3,952,880. In this patent there is disclosed a manipulator including an end effector, with a system of plural sensing units including photocells disposed between the wrist and end effector for sensing both the magnitude and direction of forces acting along three mutually orthogonal axes intersecting at the robot's wrist.

U.S. Pat. No. 4,648,784 discloses a drive protection device which is connectable between two portions of a driven operating device such as a robot manipulator, for protecting against collisions. If a collision occurs, the positions of ball elements spacing apart a pair of disks is changed, and resultant movement of the disks actuates a switch for causing disconnection of the drive.

Such known devices are, however, mechanically complex, and thus there remains a need for a simple, less complex device for detecting robot collisions.

In the present invention, there is provided a piezoelectric load cell robot collision detector which in a preferred embodiment senses compressive forces at the robot wrist. The invention utilizes a thin film of polyvinylidene fluoride (PVDF), which is a piezoelectric material. When stressed, PVDF film generates a difference in potential between its two surfaces. These surfaces are metallized for electrical contact with the film. The metallized PVDF film and a resilient pad are precompressed between two plate-like members, and this assembly is mounted between the robot wrist and end effector. If a collision affecting the end effector occurs, the collision forces further compress the PVDF film, generating a voltage pulse which is then amplified and can then be transmitted to the robot control for analysis.

The use of piezoelectric force sensors is well known in various arts. For example, U.S. Pat. No. 4,286,459 discloses a force sensor formed as a flexible piezoelectric strip which is stretched in tension and caused to oscillate, producing pulse output signals at a certain frequency, the sensor being used for measuring tension.

U.S. Pat. No. 4,634,917 discloses an active multi-layer piezoelectric tactile sensor utilizing a piezoelectric PVF2 sensing layer.

U.S. Pat. No. 4,555,953 discloses a composite, multifunctional tactile sensor utilizing a piezoelectric material such a PVF2 or PVDF.

U.S. Pat. No. 4,499,394 discloses an encapsulated piezoelectric plastic pressure sensor utilizing PVDF film for sensing compressive forces resulting from the foot pressure of an animal, and usable while the animal is under locomotion.

U.S. Pat. No. 4,488,873 discloses a piezoelectric occlusal force sensor utilizing a folded PVDF film structure for sensing the bite force exerted by a dental patient.

U.S. Pat. No. 4,348,142 discloses a control handle of the joystick type for permitting an operator to control a robot manipulator in six axes. The handle is supported by plural force-sensing bearings which in one embodiment consist of piezoelectric capsule sensors fed by a high frequency generator.

These known piezoelectric force sensors do not, however, lend themselves to use in detecting robot collisions. In particular, a robot collision detector must not only be capable of sensing collision forces but also, importantly, must provide structural integrity and rigidity to the robot arm as well.

In the piezoelectric collision detector according to the present invention, the use of the plate-like members provides necessary structural rigidity and integrity to the robot arm in which the detector is installed. One plate-like member is adapted for attachment to the robot wrist, while the other plate-like member is adapted for attachment to the robot end effector. Under the influence of forces resulting from, for example, obstruction of the end effector, the plate-like members transmit compressive forces to the piezoelectric film sandwiched therebetween. Means are provided for permitting relative yielding axial deflection to occur between the plate-like members while maintaining necessary structural alignment therebetween in order to maintain structural rigidity between the robot wrist and end effector.

It is therefore an object of the present invention to provide a piezoelectric load cell which is capable of effectively detecting the forces resulting from robot collisions and obstructions.

It is also an object of the present invention to provide a robot collision detector which is simple in construction and relatively inexpensive to manufacture.

It is further an object of the present invention to provide a robot collision detector which utilizes a piezoelectric film force sensor means.

It is still further an object of the present invention to provide a piezoelectric load cell which may be mounted between a robot wrist and end effector for detecting compressive forces therebetween.

It is yet another object of the present invention to provide a piezoelectric load cell robot collision detector which when mounted between a robot wrist and end effector provides for the detection of compressive forces acting therebetween while also maintaining structural alignment and integrity therebetween.

BRIEF DESCRIPTION OF THE DRAWINGS

The objects, features and advantages of the present invention will be made apparent from the following detailed description taken together with the drawings in which like elements among the several figures are designated by like numerals.

FIG. 1 is an exploded perspective view showing the structural components of the piezoelectric load cell according to the present invention;

FIG. 2 is a side view showing the piezoelectric load cell in cross-section, and showing a typical mounting arrangement of the robot collision detector of the present invention; and FIG. 3 is a schematic diagram of an electrical circuit usable with the piezoelectric load cell of the present invention.

DETAILED DESCRIPTION OF THE INVENTION

Referring now to FIG. 1 there is indicated generally at 10 the piezoelectric load cell robot collision detector of the present invention. The load cell 10 includes a piezoelectric force sensing element 20 which preferably is fabricated from a piezoelectric polyvinylidene fluoride (PVDF) film. Aluminum metallization is provided on both surfaces of the PVDF film. As shown, the metallized PVDF film is preferably cut or otherwise formed in a generally circular shape, with a contiguous tab portion 22 extending outwardly therefrom at one edge. Copper foil or tape 24 is conductively applied, such as with conductive adhesive, to both metallized surfaces of tab portion 22 for providing solderable contact surfaces for electrical connection between the respective metallized surfaces of the sensing element 20 and a respective pair of wire leads 26. Wire leads 26 may conveniently be terminated at a terminal connector block or plug 28.

Sensing element 20 is, as mentioned above, preferably formed from a metallized PVDF film, which is commerically available. As is well known, such PVDF films are piezoelectric and, when suitably metallized, generate a voltage potential between their metallized surfaces when a compressive force or stress is applied to the film. Other types of films than PVDF are known to exhibit a piezoelectric effect when compressed, and it is contemplated that other types of piezoelectric films, such as PVF2, may also be utilized for fabricating sensing element 20.

Sensing element 20 as thusly fabricated and a resilient support pad 30 are clamped between an upper plate member 40 and a lower plate member 50, as shown in FIG. 2. Support& pad 30 is electrically non-conducting, and is preferably of silicone rubber, although other suitable resilient elastomers may be used. A second support pad (not shown) may be used above sensing element 20.

Upper plate member 40 is formed with a disk-like configuration, that is, as a short cylindrical plate or flange 42. A central circular projection or boss 44 extends a slight distance from the underside of flange 42.

Lower plate member 50 is similarly formed with a disk-like circular flange 52, and a central circular recess 54, is formed in the top surface of flange 52. Recess 54 opens radially outwardly to an edge of flange 52 by way of a recess 54a let into the top of flange 52 as shown in FIG. 1, and this recess 54a corresponds in shape to the extending tab portion 24 of sensing element 20. Plate members 40 and 50 may typically be fabricated from aluminum alloy.

In terms of relative proportions, it is preferable that the height of projection 44 on upper plate member 40 correspond to the depth of recess 54 in lower plate member 50. The film thickness of sensing element 20 may typically be on the order of 110 um, while the thickness of resilient support pad 30 may typically be 1/32 inch. Other exemplary dimensions are as follows: the circular portion of sensing element 20 may have a typical diameter of approximately 1.25 in., and support pad 30 may be formed with a diameter equal to or just slightly greater than that of sensing element 20.

The flange portions 42,52 of upper and lower plate members 40,50 may typically be formed with equivalent outer diameters of, for example, 2.10 inches, while the height of projection 44 from the underside of flange 42, as well as the depth of recess 54,54a from the upper surface of flange 52 may both typically be on the order of 0.05 inch.

As noted previously, sensing element 20 and support pad 30 are clamped compressively between upper plate member 40 and lower plate member 50. Recess 54 should thus have a diameter sufficient to accommodate support pad 30 therein while projection 44 should have a diameter sufficient to fully bear upon sensing element 20 and pad 30. Further, recess 54 should be larger in diameter than projection 44, in order to provide a clearance therebetween. For example, in the case as previously described where the diameter of sensing element 20 is 1.25 inches, then projection 44 may have a diameter of 1.38 inches, with recess 54 having a diameter of 1.50 inches.

The respective facing surfaces of upper and lower plate members 40 and 50 are lined with electrical insulation at least covering the projection 44 and recesses 54, 54a. A preferred electrical insulator for this purposes in Teflon-insulating tape or film, which is commercially available.

In order to maintain plate members 50 and 50 in concentric alignment, a pair of dowel pins 70 are-fitted in diametrally opposed holes 72 form ⓡd in the flange portion 52 of bottom plate member 50. A corresponding pair of diametrally opposed through-holes 74 are provided in the flange portion 42 of upper plate member 40, aligned with dowel pins 70 and sized for a slip fit thereon, thus enabling member 40 to be slidably engaged on dowel pins 70.

A plurality of threaded holes 76 are formed at intervals in flange portion 52 of lower plate member 50. A corresponding plurality of through-holes 78 are provided in the flange portion 42 of upper plate member 40 for receiving therethrough a corresponding number of machine screws 80 which are threadably receivable in holes 76. Through-holes 78 are preferably counterbored to receive therein the head portions of screws 80, so that the tops of the heads of screws 80 Will fit flush in flange 42.

In this way, with sensing element 20 and support pad 30 positioned therebetween, e.g., placed on lower plate number 50, the upper and lower plate members 40 and 50 are then assembled together with screw 80 which are tightened down so as to clamp sensing element 20 and support pad 30 between projection 44 and recess 54 and to place sensing element 20 and support pad 30 in compression.

As thusly constituted, the piezoelectric load cell 10 of the present invention is operable for providing a voltage output on wire leads 26 in response to any further compression of sensing element 20.

As shown in the exemplary mounting arrangement of FIG. 2, the piezoelectric film load cell 10 may typically be mounted between the wrist W and end effector E of an industrial robot arm or manipulator for detecting collisions occurring between the end effector E and/or a tool or part gripped thereby, and a workpiece or other obstruction. A remote center compliance R may be provided between the robot wrist W and the load cell 10.

For permitting mounting of the piezoelectric film load cell 10 to the other mechanical components of the robot arm, the plate members 40 and 50 may be provided with various fittings and attachment means. For example, a plurality of dowel pins 90 may be received in holes 92 provided in flange portion 42 of upper plate member 40 for ensuring alignment with the corresponding robot arm component such as the wrist W or compliance center R to which the upper plate member may be securely affixed as by screws (not shown) or other suitable fixing means. A central boss 94 may be formed on the upper surface of flange portion 4 of upper plate member 40, and a flanged coupling ring 96 and central recess 98 may be formed on the underside of lower plate member 50 for mating engagement with the robot arm component such as the end effector E to which the lower plate member 50 of the load cell 10 may be securely affixed.

The exact method and means by which the piezoelectric film load cell robot collision detector 10 is mounted to the robot arm will typically vary according to the physical configuration(s) of the attachment points of the robot arm components, and will be within the ability of one of ordinary skill in the robotic machinery art. However, in order that the detector 10 be able to detect forces acting on the robot's end effector, the detector should preferably be mounted adjacent the end effector and securely connected therewith in force-coupling relation, as for example by means of a flanged coupling ring/collar type connection. Furthermore, in order to provide necessary structural rigidity and alignment between the robot wrist and end effector, it is preferable to provide alignment means such as dowel pins between mating faces, along with other mating/force-coupling features such as bosses or projections fitting into corresponding recesses.

In operation, the detector 10 is responsive to compression forces, and, as it is intended to mount the detector 10 in alignment with the robot end effector and wrist, obstruction of the robot arm due to collision between the end effector and a workpiece during movement of the robot arm will cause the upper and lower plate members 40,50 to further compress sensing element 20 and support pad 30. This further compression stresses the PVDF film and generates a voltage pulse output on wire leads 26.

Thus, force on the end effector caused by obstruction or colliding of the end effector causes further compression of the sensing element 20 and support pad between upper and lower plate members 40 and 50, which stresses the piezoelectric film which in turn generates a voltage pulse.

The sensing element 20 has a high output impedance and it is therefore preferable to buffer and amplify the detector output voltage signal for transmission to the robot controller. An exemplary linear circuit for this purpose is shown schematically in FIG. 3, and consists of a buffer amplifier circuit 100 and an inverting amplifier circuit 102 connected in series between the voltage output of the piezoelectric film detector device 10 and a signal output line 104. Amplifier circuits 100,102 may be constructed with operational amplifiers in known fashion. In operation, unity gain buffer 100 provides a high input impedance to the detector output voltage pulses, and these voltage pulses are then inverted and amplified by inverting amplifier 102 and provided at its low impedance output line 104 for transmission to the robot control.

At the robot control (not shown) the transmitted voltage pulse may typically be input to an analog-digital (A-D) converter and further processed and analyzed under program control to cause corrective action to be implemented by the robot control when a collision is thus detected. For example, the detector output pulses can be compared to a reference threshold level for providing rapid determination that a collision has occurred.

The present invention thus advantageously provides a robot collision detector utilizing a piezoelectric film load cell force sensor, the described detector being particularly well suited to detection of an end effector collision and providing an output signal voltage pulse indicating the collision force. The detector of the present invention is of simple construction and operation, provides desirable structural features for robotics applications, and performs its functional role without the drawbacks of known sensing devices.

The detector of the present invention lends itself to modification for various applications in the robotics field, and it is contemplated that such modifications fall within the scope of the invention which is limited only by the appended claims.

What is claimed:

1. A robot collision detector comprising:
   piezoelectric film force sensing means for generating an output voltage signal in response to compressive stresses thereon;
   support means for resiliently supporting said force sensing means;
   first and second plate means for compressively clamping therebetween said force sensing means and said support means; and means for mounting said first and second plate means between a robot arm wrist and end effector.

2. A robot collision detector according to claim 1, wherein said force sensing means is formed from polyvinylidene fluoride film having the respective surfaces thereof metallized.

3. A robot collision detector according to claim 1, further comprising:
means for maintaining said first and second plate means in concentric alignment.

4. A robot collision detector according to claim 3, wherein said first and second plate means are dowelled and screwed together to maintain said first and second plate means in concentric alignment.

5. A robot collision detector according to claim 1, further comprising:
means for buffering a voltage output of said force sensing means.

6. A robot collision detector according to claim 1, further comprising:
means for amplifying said output voltage signal generated by said force sensing means.

7. A piezoelectric load cell, comprising:
a circular metallized piezoelectric film force sensing element;
a pair of wire leads fixed in electrical contract with respective metallized surfaces of said piezoelectric film force sensing element;
a circular resilient support pad for supporting thereon said piezoelectric film force sensing element;
a circular first plate member having a peripheral flange portion, and a centrally formed circular recess in an upper face thereof for receivably supporting therein said support pad, a pair of dowel pins being fitted in said flange portion at diametrally opposite locations thereon, said flange portion being further provided with a plurality of threaded holes therein at intervals therearound;
a circular second plate member having a peripheral flange portion, and a centrally formed circular projection formed on a lower face thereof for bearing fully upon said piezoelectric film force sensing element, a pair of clearance holes being provided through said flange portion and aligned with said dowels for slidingly receiving said dowel pins fitted in said first plate member, said flange portion being further provided with a plurality of throughholes at intervals therearound and aligned with said threaded holes in said first plate member; and
a plurality of screws threadedly fastening said first and second plate members together with said piezoelectric film force sensing element and said support pad clamped in compression between said recess of said first plate member and said projection of said second plate member.

8. A piezoelectric load cell according to claim 7 further comprising electrical insulation provided respectively between said first plate member and said support pad, and between said second plate member and said piezoelectric film force sensing element.

9. A piezoelectric load cell according to claim 7 further comprising means for mounting said first and second plate members between a robot wrist and end effector.

10. A robot collision detector comprising:
piezoelectric film force sensing means for generating an output voltage signal in response to compressive stresses thereon;
support means for resiliently supporting said force sensing means; and
first and second plate means for compressively clamping therebetween said force sensing means and said support means;
said first plate means having a recess in a surface thereof for receiving therein said force sensing means and said support means;
said second plate means having a projection on a surface thereof for bearing on said sensing means and said support means.

* * * * *